(12) United States Patent
Kim et al.

(10) Patent No.: US 11,087,117 B2
(45) Date of Patent: Aug. 10, 2021

(54) APPARATUS FOR IDENTIFYING FAKE FINGERPRINT AND MANUFACTURING METHOD THEREOF

(71) Applicant: SUPREMA INC., Gyeonggi-do (KR)

(72) Inventors: Youngmin Kim, Gyeonggi-do (KR); Jong Woo Lee, Gyeonggi-do (KR); Daejin Kwon, Gyeonggi-do (KR); Bong Seop Song, Gyeonggi-do (KR); Jae Won Lee, Gyeonggi-do (KR)

(73) Assignee: SUPREMA INC., Gyeonggi-do (KR)

( * ) Notice: Subject to any disclaimer, the term of this patent is extended or adjusted under 35 U.S.C. 154(b) by 0 days.

(21) Appl. No.: 16/808,698

(22) Filed: Mar. 4, 2020

(65) Prior Publication Data

US 2020/0202106 A1  Jun. 25, 2020

Related U.S. Application Data

(63) Continuation of application No. 15/634,542, filed on Jun. 27, 2017, now Pat. No. 10,621,409.

(30) Foreign Application Priority Data

Aug. 3, 2016  (KR) .......................... 10-2016-0099058

(51) Int. Cl.
    *G06K 9/00* (2006.01)
(52) U.S. Cl.
    CPC ....... *G06K 9/00087* (2013.01); *G06K 9/0004* (2013.01); *G06K 9/0012* (2013.01); *G06K 9/00046* (2013.01)

(58) Field of Classification Search
CPC ........... G06K 9/00087; G06K 9/00046; G06K 9/0012; G06K 9/0004
See application file for complete search history.

(56) References Cited

U.S. PATENT DOCUMENTS 9,141,847 B2    9/2015  Shin et al.
10,621,409 B2 *  4/2020  Kim .................... G06K 9/0004
(Continued)

FOREIGN PATENT DOCUMENTS

KR    10-1436786 B1    9/2014
KR    10-1493743 B1    2/2015

OTHER PUBLICATIONS

Extended European Search Report dated Mar. 6, 2018 issued in corresponding European Patent Application No. 17178473.9.

*Primary Examiner* — Abhishek Sarma
(74) *Attorney, Agent, or Firm* — Maier & Maier, PLLC

(57) ABSTRACT

An apparatus for identifying a fake fingerprint includes a housing, a prism, a first light source unit, a second light source unit, a sensor unit and a control unit. The prism is disposed in the internal space of the housing. The first light source unit irradiates light in the internal space to allow the light to pass through the prism. The second light source unit irradiates light to allow the light not to pass the prism. The sensor unit acquires a first image through the first light source unit and a second image through the second light source unit. The control unit identifies a fake fingerprint on the basis of a result acquired by comparing the first image and the second image. The housing includes a light irradiating unit that fixes and supports the second light source unit to form a predetermined angle with the fingerprint contact surface.

10 Claims, 7 Drawing Sheets

(56) References Cited

U.S. PATENT DOCUMENTS

| | | |
|---|---|---|
| 2011/0267445 A1 | 11/2011 | Oguchi |
| 2014/0023249 A1 | 1/2014 | Higuchi |
| 2014/0286548 A1 | 9/2014 | Shin et al. |
| 2015/0205992 A1 | 7/2015 | Rowe |

* cited by examiner

APPARATUS FOR IDENTIFYING FAKE FINGERPRINT AND MANUFACTURING METHOD THEREOF

CROSS-REFERENCE TO RELATED APPLICATIONS

This is a continuation application of a non-provisional application having U.S. patent application Ser. No. 15/634,542 filed on Jun. 27, 2017 which claims priority to Korean Application No. 10-2016-0099058 filed on Aug. 3, 2016, the contents of which are all incorporated herein by reference.

TECHNICAL FIELD

The disclosure relates to a fake fingerprint identifying apparatus and a manufacturing method thereof. Particularly, the disclosure relates to a fingerprint recognition device that discriminates a fake fingerprint by comparing images acquired using light sources, and a manufacturing method thereof.

BACKGROUND

As is generally known, a fingerprint has various features including ridges, valleys, minute points, and the like. The minute points include bifurcations where ridges furcate and end points where ridges end. The fingerprint feature distribution is different for each individual and individuals do not have the same fingerprint, and thus fingerprints are regarded as highly specific biometric data. Therefore, a security system that employs biometric data such as a fingerprint can accurately and effectively secure premises, movable assets, and the like.

The recognition and authentication technology using such fingerprint information is used in various fields due to its superior performance with a simple structure. Especially, it becomes important to effectively distinguish an artificially manufactured fingerprint (hereinafter, referred to as 'fake fingerprint') from a human fingerprint, as the technologies have been widely used in fields requiring high security, such as access control, electronic commerce, and financial transactions.

A fake fingerprint may be detected by measuring physiological analyte such as hemoglobin or the like through spectrum distribution characteristics of reflected or scattered light after irradiating a light to a finger to identify a fake fingerprint. Alternatively, a fake fingerprint may be detected based on a change in capacitance which is caused by a finger when the finger approaches a metal plate of a fingerprint sensor prism on which a small amount of charge is formed.

Further, a fake fingerprint may be detected by radiating light from the outside such that light is transmitted through a finger along an inner surface adjacent to a surface of the finger, acquiring a surface image by detecting light passing through the finger, and analyzing the surface image to judge whether or not it is a fake fingerprint. Since the living body has a large degree of light attenuation, the light rapidly attenuates while it proceeds inside of the body, and then disappears. On the other hand, in a fake fingerprint, the degree of light attenuation is small, so that most of the light is transmitted, and there is little difference between an incident light amount and a transmitted light amount. Accordingly, it is possible to identify a fake fingerprint by using the characteristic difference between the finger and the fake fingerprint.

The present applicant has proposed a device and a method for identifying a fake fingerprint in Korean Patent No. 10-1436786. The disclosure of Korean Patent No. 10-1436786 analyzes a correlation between an image produced by an external light source and an image produced by an internal light source, and judges whether a fingerprint is fake. This has the advantage that contains changes in the degree of contact between the fingerprint and a prism depending on the state of the fingerprint is acceptable.

As described above, radiation direction and radiation angle of light radiated by the internal light source are very important in identifying a fake fingerprint using an image by the internal light source and an image by the external light source. This is because the radiation direction and the radiation angle of the light determine the angle or amount of the light reaching the finger or the fake fingerprint and the identifying performance for the fake fingerprint may be varied.

SUMMARY

According to embodiments of the disclosure, there is provided a fake fingerprint identifying apparatus in which an external light source is fixedly supported such that light emitted from the external light source is radiated on a finger or a fake fingerprint at a predetermined angle, and a method of manufacturing the same.

The subject matter of the disclosure may not be limited to the above description, and another subject matter, which has not mentioned in the description, would be clearly understood by those skilled in the art through the following descriptions.

In accordance with an aspect, there is provided an apparatus for identifying a fake fingerprint. The apparatus includes a housing, a prism, a first light source unit, a second light source unit, a sensor unit and a control unit. The housing includes an insertion space for allowing insertion of a finger, and an internal space separated from the insertion space. The prism is disposed in the internal space of the housing such that a fingerprint contact surface of the prism is exposed to the insertion space. The first light source unit irradiates light in the internal space toward the insertion space through the prism. The second light source unit irradiates light in the internal space toward the insertion space without through the prism. The sensor unit acquires a first image through the prism from the light irradiated by the first light source unit, and acquires a second image through the prism from the light irradiated by the second light source unit. The control unit identifies a fake fingerprint on the basis of a result acquired by comparing the first image and the second image. The housing includes a light irradiating unit that fixedly supports the second light source unit such that a center of light irradiated by the second light source unit forms a predetermined angle with the fingerprint contact surface.

The housing may further includes a touch area defined in the insertion space to allow a fingerprint surface of the finger to be touched on the fingerprint contact surface; and a transmission window provided between the insertion space and the internal space to allow light irradiated by the second light source unit to pass through the transmission window.

The second light source unit may include a first optical element and a second optical element, which emit light in different frequency bands, respectively. The transmission window may include a first transmission window configured to allow a center of light emitted by the first optical element to form a first angle with the fingerprint contact surface, and a second transmission window configured to allow a center of light emitted by the second optical element to form a second angle with the fingerprint contact surface. The second angle is different from the first angle.

The touch area may include a partition wall configured to separate the insertion space from the internal space; and an opening defined by the partition wall such that the fingerprint contact surface of the prism is exposed to the insertion space through the opening. The partition wall may include a light transmission layer that allows light emitted by the first optical element to pass through the light transmission layer and to be irradiated along the partition wall.

The first transmission window may be disposed at a location corresponding to the light transmission layer so that light emitted by the first optical element is irradiated along a surrounding area of the opening through the light transmission layer.

The second transmission window may be disposed outside the light transmission layer so that light emitted by the second optical element is irradiated to the outside of the light transmission layer.

In accordance with another aspect, there is provided a method of manufacturing a fake fingerprint identifying apparatus. The fake fingerprint identifying apparatus includes: a housing including a first region which defines an insertion space for allowing insertion of a finger, and a second region which defines an internal space separated from the insertion space; a prism disposed in the internal space of the housing such that a fingerprint contact surface of the prism is exposed to the insertion space; a first light source unit configured to irradiate light in the internal space toward the insertion space through the prism; a second light source unit configured to radiate light in the internal space toward the insertion space without through the prism, the second light source unit being fixedly supported by the housing such that a center of the light, which is irradiated by the second light source unit, forms a predetermined angle with the fingerprint contact surface; a sensor unit configured to acquire a first image through the prism from the light irradiated by the first light source unit, and to acquire a second image through the prism from the light irradiated by the second light source unit; and a control unit configured to identify a fake fingerprint on the basis of a result obtained by comparing the first image and the second image. In the method, forming a structure comprising at least a portion of the first region of the housing; and molding the housing comprising the first region and the second region in a state when the structure is inserted in a mold.

The housing may further include: a transmission window provided between the insertion space and the internal space so that the light irradiated by the second light source unit passes through the transmission window, and wherein, in the forming a structure, the structure corresponding to the first region is formed of a transparent material, and in the molding the housing, the housing comprising the first region and the second region is molded in a state when the structure of the transparent material is inserted in the mold. The method may further include: forming an opaque layer on an exposed surface of the structure, which is exposed to the internal space; and removing a portion of the opaque layer to form the transmission window.

The housing may further include: a touch area defined in the insertion space to allow a fingerprint surface of the finger to be touched on the fingerprint contact surface; and a transmission window provided between the insertion space and the internal space to allow light irradiated by the second light source unit to passes through the transmission window.

In the forming the structure, a first structure includes the touch area is formed of a transparent material, and in the molding the housing, a second structure includes the first region is molded in a state when the first structure is inserted in a mold. The method may further include: forming an opaque layer on an exposed surface of the first structure, which is exposed to the internal space; removing a portion of the opaque layer to form the transmission window; forming a third structure corresponding to the second region; and assembling the second structure and the third structure to form the housing.

According to embodiments of the disclosure, since the light source is fixedly supported to enable light emitted from the light source provided in the inner space of the housing is directed toward the finger insertion space of the housing, the angle or quantity of light reaching the finger or the fake fingerprint located in the finger insertion space is maintained constant. Accordingly, the performance of identifying a fake fingerprint is secured.

In addition, when a plurality of external light sources are provided outside the prism for identifying a fake fingerprint, the external light sources are fixedly supported so that the external light sources irradiate light at different angles. Thus, a customized external light source corresponding to various kinds of fake fingerprints is available, thereby identifying performance for a fake fingerprint is improved.

Further, by embodying a light-transmitting layer in a touch area provided so that a fingerprint surface of a finger can be seated in the finger insertion space of the housing, the light emitted from the external light source for identifying a fake fingerprint is radiated through the light-transmitting layer as an intermediary. This has the effect of improving a light transmission efficiency for the fingerprint of the finger or the fake fingerprint, thereby improving the identifying performance of a fake fingerprint.

BRIEF DESCRIPTION OF THE DRAWINGS

The objects and features of the present disclosure will become apparent from the following description of embodiments, given in conjunction with the accompanying drawings, in which.

DETAILED DESCRIPTION

Advantages and features of the present disclosure, and a method for achieving them will be apparent with reference to the embodiments described herein below in detail together with accompanying drawings. However, it should be noted that the present disclosure is not limited to the embodiments disclosed herein below, but may be implemented in various forms. It should be noted that the embodiments are provided to make the description of the present disclosure complete, and assist those skilled in the art of the present disclosure to understand the scope of present disclosure, defined just by the scope of the claims.

In the following description, well-known functions and/or constitutions will not be described in detail if they would unnecessarily obscure the features of the present disclosure in unnecessary detail. Further, the terms to be described below are defined in consideration of their functions in the embodiments of the present disclosure and may vary depending on the intention of a user or an operator and the practice. Accordingly, the definition may be made on the basis of the content throughout the specification.

Figure 1:
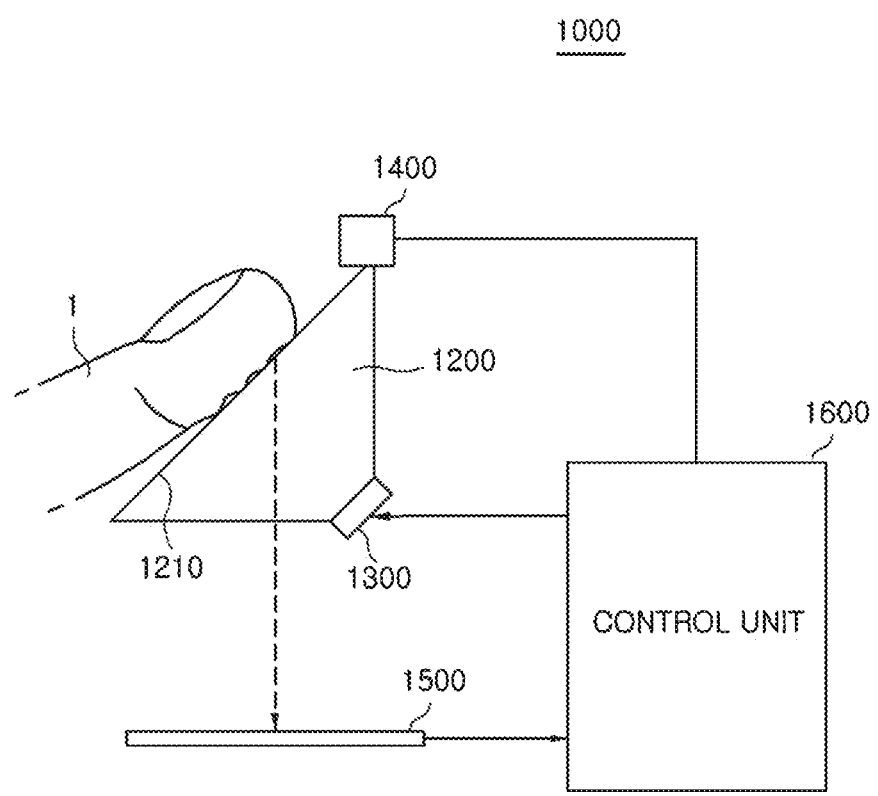
FIG. 1 is a diagram of a fake fingerprint identifying apparatus according to an embodiment, wherein illustration of a housing is omitted.
Figure 2:
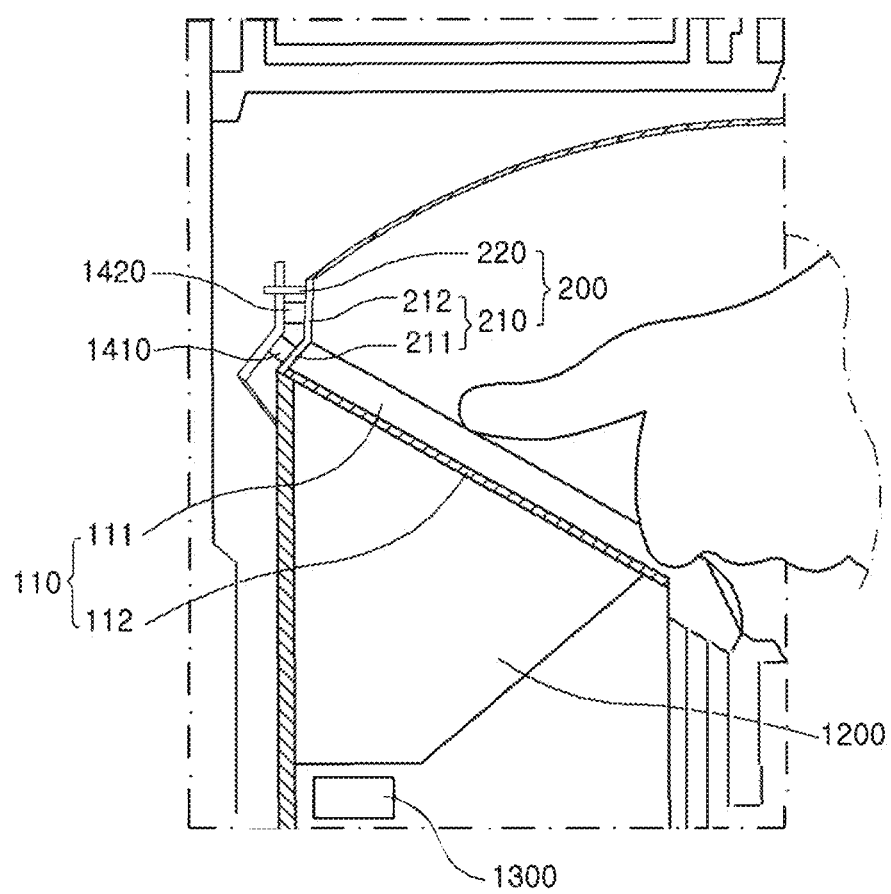
FIG. 2 is a sectional view of a portion of a housing of the fake fingerprint identifying apparatus according to the embodiment.
Figure 3:
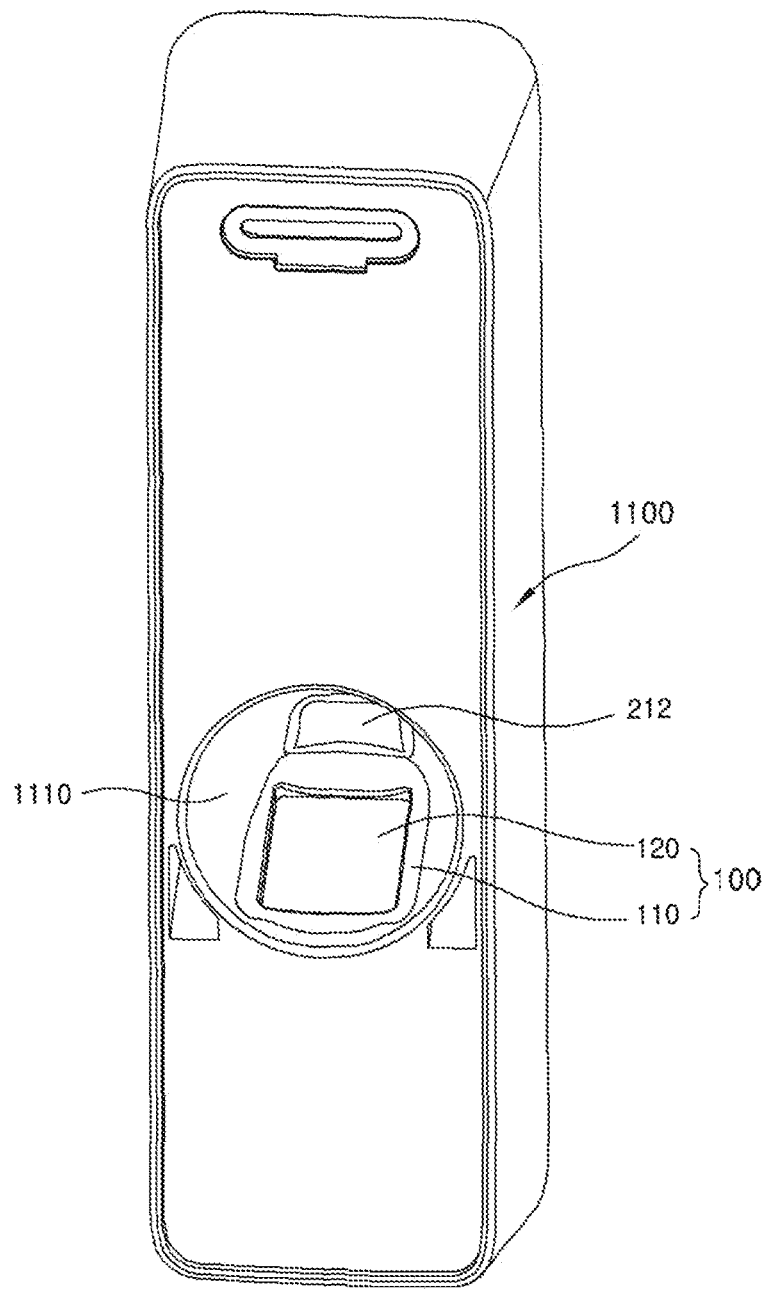
FIG. 3 is a perspective view of an insertion space of the housing of the fake fingerprint identifying apparatus according to the embodiment.
Figure 4:
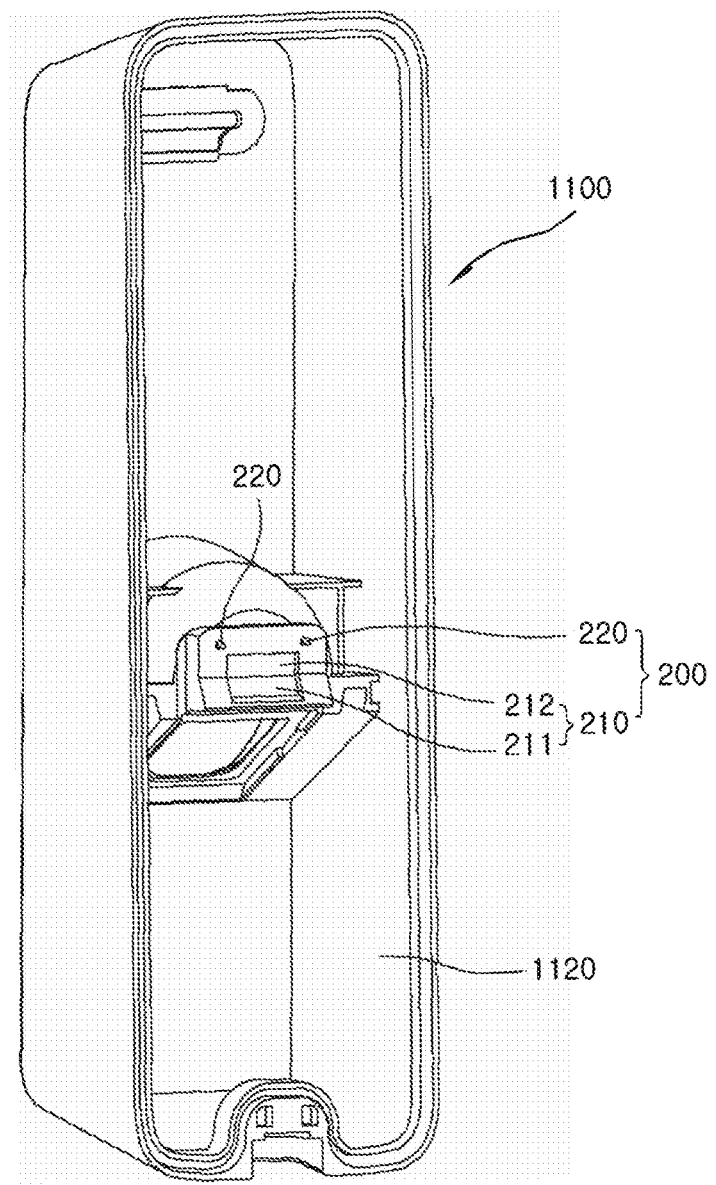
FIG. 4 is a perspective view of an internal space of the housing of the fake fingerprint identifying apparatus according to the embodiment.

FIG. 1 is a diagram illustrating a fake fingerprint identifying apparatus, excluding a housing, according to an embodiment. FIG. 2 is a sectional view of a portion of a housing of the fake fingerprint identifying apparatus according to an embodiment. FIG. 3 is a perspective view of an insertion space of the housing of the fake fingerprint identifying apparatus according to an embodiment. FIG. 4 is a perspective view of an internal space of the housing of the fake fingerprint identifying apparatus according to an embodiment.

The fake fingerprint identifying apparatus 1000 according to the present embodiment includes a housing 1100, a prism 1200, a first light source unit 1300, a second light source unit 1400, a sensor unit 1500, and a control unit 1600.

The housing 1100 has a first region that defines an insertion space 1110 to allow the insertion of a finger 1, and a second region that defines an internal space 1120 separated from the first region. The configuration of the housing 1100 will be described in detail later.

The prism 1200 has on one side thereof a fingerprint contact surface 1210 for contact with a fingerprint surface of the finger 1, and is disposed in the internal space of the housing 1100 to allow the fingerprint contact surface 1210 to be exposed to the insertion space 1110 of the housing 1100.

The first light source unit 1300 irradiates light in the internal space 1120 of the housing 1100 toward the insertion space 1110 of the housing 1100 through the fingerprint contact surface 1210 of the prism 1200. For example, the first light source unit 1300 may be embodied as a white light emitting diode (LED).

The second light source unit 1400 irradiates light in the internal space 1120 of the housing 1100 toward the insertion space 1110 of the housing 1100 through the fingerprint contact surface 1210 of the prism 1200. The second light source unit 1400 may include a plurality of light sources that can be individually controlled by the control unit 1600. For example, the second light source unit 1400 may include a first optical element 1410 and a second optical element 1420 which emit light of different frequency bands, respectively. For example, the first optical element 1410 may be embodied as an infrared ray LED, and the second optical element 1420 may be embodied as a white LED. As described above, in the case in which the second light source unit 1400 used for identifying a fake fingerprint is embodied by a plurality of optical elements, a customized external light source corresponding to various types of fake fingerprints may be available by enabling the optical elements to irradiate light at different angles.

The sensor unit 1500 acquires an image through the fingerprint contact surface 1210 of the prism 1200 in response to a control signal of the control unit 1600, and provides a digital image signal to the control unit 1600. The sensor unit 1500 acquires a first image through the prism 1200 corresponding to light radiated by the first light source unit 1300, and acquires a second image through the prism 1200 corresponding to light radiated by the second light source unit 1400. For example, the sensor unit 1500 may be embodied as a charge coupled device (CCD) image sensor or a complementary metal-oxide semiconductor (CMOS) image sensor.

The control unit 1600 identifies a fake fingerprint based on a result acquired by comparing the first image and the second image acquired by the sensor unit 1500. The control unit 1600 may analyze a correlation by comparing a first digital image signal acquired on the basis of light irradiated by the first light source unit 1300 and a second digital image signal acquired on the basis of light irradiated by the second light source unit 1400, and may identify a fake fingerprint based on the analysis result. Also, based on a result acquired by comparing the first digital image signal acquired as the first light source unit 1300 drives and previously registered fingerprint information, the control unit 1600 may provide an authentication result fora fingerprint. For example, the control unit 1600 may be embodied as a processor, such as a central processing unit (CPU) or the like.

The configuration of the housing 1100 will be described in detail as follows.

The housing 1100 includes a touch area 100, which is defined in the insertion space 1110 to allow a fingerprint surface of the finger 1 to be touched on the fingerprint contact surface 1210 of the prism 1200.

Also, the housing 1100 further includes a light irradiating unit 200 that fixedly supports the second light source unit 1400 such that the center of light irradiated from the second light source unit 1400 in the internal space 1120 forms a predetermined angle with the fingerprint contact surface 1210 of the prism 1200.

As described above, the second light source unit 1400 is fixedly supported to allow light, which is emitted from the second light source unit 1400 mounted in the internal space 1120 of the housing 1100, to be irradiated toward the insertion space 1110 of the housing 1100 at a predetermined angle, and thus, the angle or quantity of light that reaches a finger or a fake fingerprint placed in the insertion space 1110 may be kept constant.

Here, an irradiation angle of light irradiated by the second light source unit 1400 may be determined based on an angle formed by the fingerprint contact surface 1210 and a light transmission window 210.

The light transmission window 210 of the housing 1100 includes a first transmission window 211 and a second transmission window 212.

The first transmission window 211 allows the center of light emitted from the first optical element 1410 of the second light source unit 1400 to form a first angle with the fingerprint contact surface 1210 of the prism 1200 so that the light emitted from the first optical element 1410 is irradiated along the fingerprint contact surface 1210. For example, the first angle may be a parallel angle, i.e., 0° degree. Alternatively, when it is assumed that an extension line of the center of the light emitted from the first optical element 1410 is a first extension line and an extension line of the fingerprint contact surface 1210 is a second extension line, the first angle, which is a crossing angle of the first extension line and the second extension line may be an angle of 5 to 10 degrees. The first angle is an angle to provide guidance so that the light emitted from the first optical element 1410 is irradiated along a partition wall 110 of the housing 1100.

The second transmission window 212 allows the center of light emitted from the second optical element 1420 of the second light source unit 1400 to form a second angle, which is different from the first angle, with the fingerprint contact surface 1210 of the prism 1200 so that the light emitted from the second optical element 1420 is irradiated to the upper side of a finger which may be touched on the fingerprint contact surface 1210. For example, when it is assumed that an extension line of the center of the light emitted from the second optical element 1420 is a third extension line and an extension line of the fingerprint contact surface 1210 is a second extension line, the second angle, which is a crossing angle of the third extension line and the second extension line, may be an angle of 25 to 35 degrees. The second angle is an angle to provide guidance so that the light emitted from the second optical element 1420 is irradiated to the outside of a light transmission layer 111 of the housing 1100.

The touch area 100 of the housing 1100 includes the partition wall 110 and an opening 120. The partition wall 110 separates the insertion space 1110 and the internal space 1120. The opening 120 is defined by the partition wall 110 and the fingerprint contact surface 1210 of the prism 1200 is exposed to the insertion space 1110 through the opening 120.

The partition wall 110 of the housing 1100 includes the light transmission layer 111 disposed on the side of the insertion space 1110, and an opaque layer 112 disposed on the side of the internal space 1120. For example, the partition wall 110 that has the light transmission layer 111 may be formed of a transparent material with optical permeability, and then the opaque layer 112 may be formed through a black spray process. In addition, masking may be applied when the opaque layer 112 is formed so that the first transmission window 211 and the second transmission window 212 maintain transparency and optical permeability. Alternatively, the first transmission window 211 and the second transmission window 212 may be formed through a cutting process with respect to a corresponding region of the opaque layer 112, after the opaque layer 112 is formed.

The light transmission layer 111 allows light, which is emitted from the first optical element 1410 of the second light source unit 1400, to be transmitted through the light transmission layer 111 and to be irradiated along the partition wall 110. To this end, the first transmission window 211 of the housing 1100 is disposed at a location corresponding to the light transmission layer 111 so that light emitted from the first optical element 1410 is irradiated along a surrounding area of the opening 120 through the light transmission layer 111. Also, the second transmission window 212 of the housing 1100 is disposed outside the light transmission layer 111 so that light emitted from the second optical element 1420 is irradiated to the outside of the light transmission layer 111.

As described above, since the touch area 100, which is defined in the insertion space 1110 of the housing 1100 to allow a fingerprint surface of a finger to be touched on the fingerprint contact surface 1210 of the prism 1200 through the touch area 100, is embodied to include the light transmission layer 111, light irradiated from the second light source unit 1400 to identify a fake fingerprint is irradiated through the light transmission layer 111 and a light transmission efficiency in associated with a fingerprint surface of a finger or a fake fingerprint may be improved.

Figure 5:
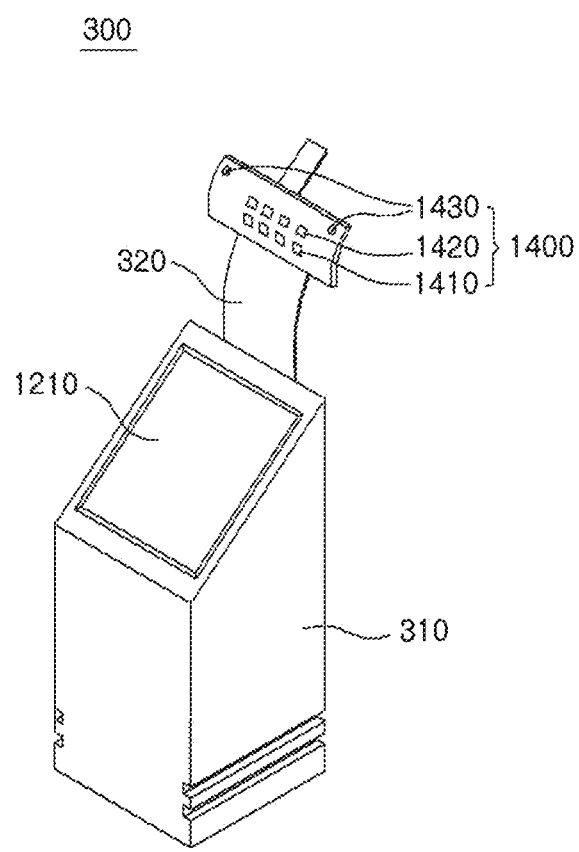
FIG. 5 is a perspective view of a fingerprint recognizing module in which a prism, a first light source unit, a second light source unit, a sensor unit, and a control unit, which are included in the fake fingerprint identifying apparatus are integrally arranged.

FIG. 5 is a perspective view of a fingerprint recognizing module 300 including the prism 1200, the first light source unit 1300, the second light source unit 1400, the sensor unit 1500, and the control unit 1600, which are included in the fake fingerprint identifying apparatus 1000.

The fingerprint recognizing module 300 further includes a case 310. The prism 1200 is contained in the case 310 such that the fingerprint contact surface 1210 thereof is exposed, and the prism 1200 is protected by the case 310.

In addition, the first light source unit 1300, the sensor unit 1500, and the control unit 1600 are contained in the case 310.

Furthermore, through a film wire 320, the second light source unit 1400 is electrically connected to the control unit 1600 contained in the case 310.

The fingerprint recognizing module 300 may be coupled to the housing 1100 such that the fingerprint contact surface 1210 of the prism 1200 is exposed to the insertion space 1110 through the opening 120. For example, the housing 1100 and the fingerprint recognizing module 300 may be coupled by a separate coupling member (not illustrated) in a manner that allows them to be detachable from each other.

Here, the second light source unit 1400 of the fingerprint recognizing module 300 is fixedly supported by the housing 1100, and may irradiate light in the internal space 1120 of the housing 1100 toward the insertion space 1110 of the housing 1100.

For example, the light irradiating unit 200 of the housing 1100 may include fixing projections 220 that fix the second light source unit 1400 by fitting, and fixing holes 1430 corresponding to the fixing projections 220 may be formed in the second light source unit 1400. The second light source unit 1400 may be fixed to the housing 1100 by fitting the fixing projections 220 to the fixing holes 1430.

Figure 6:
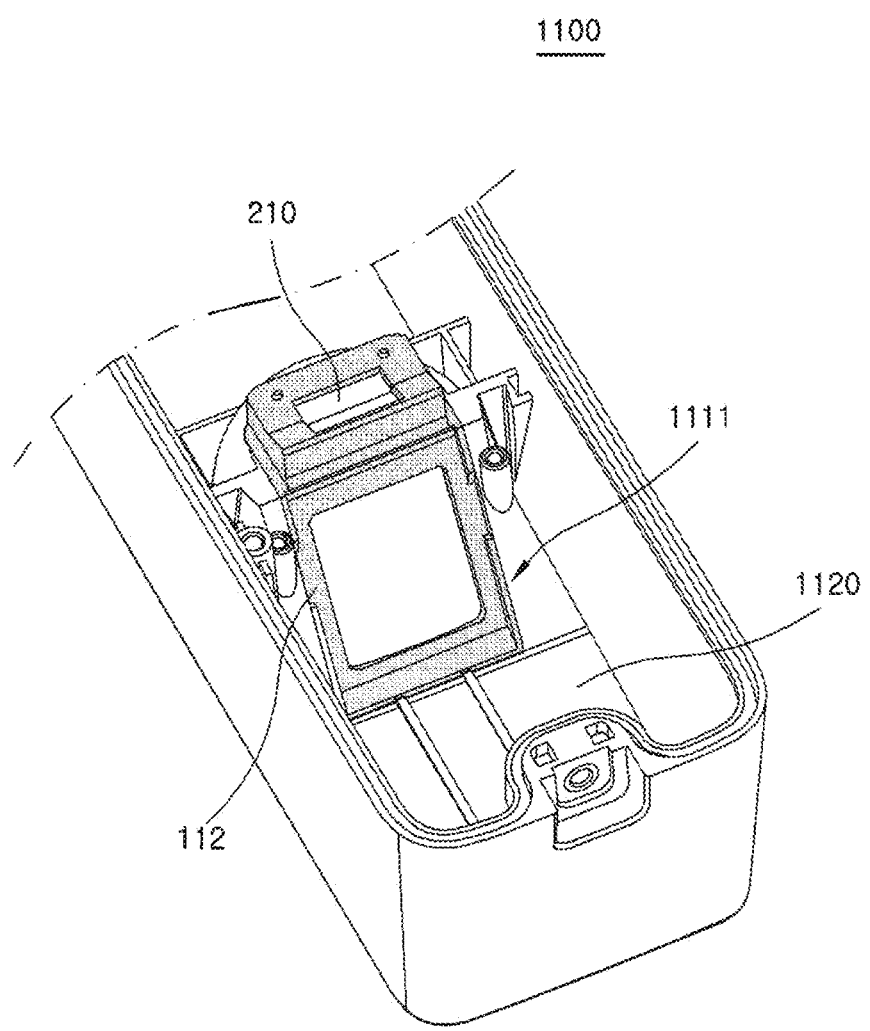
FIG. 6 is a perspective view of a housing manufactured based on a method of manufacturing a fake fingerprint identifying apparatus according to an embodiment.

FIG. 6 is a perspective view of a housing manufactured by a method of manufacturing a fake fingerprint identifying apparatus according to an embodiment.

Referring to FIGS. 3, 4, and 6, the manufacturing method forms a structure 1111 including at least a portion of the first region that defines the insertion space 1110, and performs insert molding of the housing 1100, which includes the second region that defines the internal space 1120, in a state when the structure 1111 is inserted in a mold.

First, the structure 1111 corresponding to the first region that defines the insertion space 1110 is formed of a transparent material.

Then the housing 1100, which includes the first region and the second region that defines the internal space 1120, by inserting the structure 1111 is insert-molded in a state when the structure 1111 is inserted in a mold.

Subsequently, the opaque layer 112 is formed on an exposed surface of the structure 1111, which is exposed to the internal space 1120. Here, the opaque layer 112 may be formed through a black spray process.

Subsequently, the light transmission window 210 is formed by removing a portion of the opaque layer 112. The portion of the opaque layer 112 may be removed through, e.g., a laser cutting process. Alternatively, the light transmission window 210 may be formed through a masking process while forming the opaque layer 112.

When a spray process and a print process need to be performed to the exterior of the housing 1100 which shows the insertion space 1110, the processes may be successively performed after the process of forming the opaque layer 112.

Figure 7:
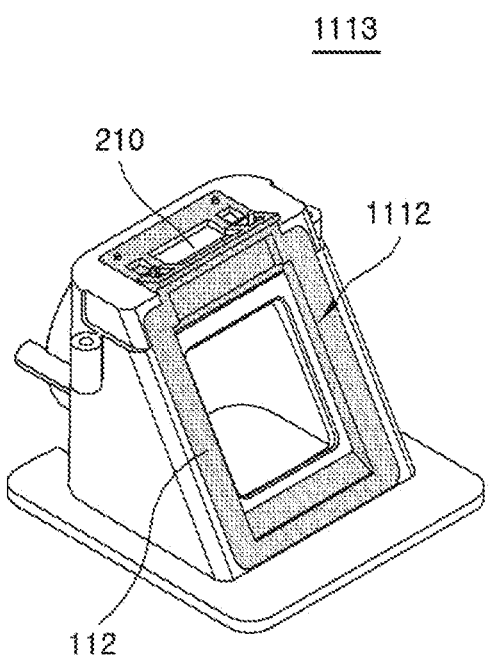
FIG. 7 is a perspective view of a portion of the housing manufactured based on the method of manufacturing a fake fingerprint identifying apparatus.

FIG. 7 is a perspective view of a portion of a housing manufactured by a method of manufacturing a fake fingerprint identifying apparatus according to another embodiment.

Referring to FIGS. 3, 4, and 7, the manufacturing method forms a first structure 1112, which defines the touch area 100 in the insertion space 1110, using a transparent material. After forming the first structure 1112 including at least a portion of the first region of the housing 1100, a second structure 1113 including the first region of the housing 1100 is insert-molded in a state when the first structure 1112 is inserted in a mold.

Subsequently, the opaque layer 112 is formed on an exposed surface of the first structure 1112, which is exposed to the internal space 1120. Here, the opaque layer 112 may be formed through a black spray process.

Subsequently, the light transmission window 210 is formed by removing a portion of the opaque layer 112. The portion of the opaque layer 112 may be removed through, e.g., a laser cutting process. Alternatively, the light transmission window 210 may be formed through a masking process while forming the opaque layer 112.

Then, a third structure (not illustrated), corresponding to the second region that defines the internal space 1120 of the housing 1100, is formed. Here, the third structure refers to a portion obtained by excluding the second structure 1113 of FIG. 7 from the housing 1100 of FIG. 4.

Subsequently, the second structure 1113 and the third structure (not illustrated) are assembled to form the housing 1100. The second structure 1113 and the third structure (not illustrated) may be assembled through a bonding process or a thermosetting process, for example.

A fingerprint recognition and fake fingerprint identification process performed by the fake fingerprint identifying apparatus 1000 will now be described.

First, when a finger or a fake fingerprint is in contact with the fingerprint contact surface 1210 of the prism 1200, the first light source unit 1300 radiates, in response to a control signal of the control unit 1600, light in the internal space 1120 of the housing 1100 toward the insertion space 1110 of the housing 1100 through the fingerprint contact surface of the prism 1200.

The light irradiated from the first light source unit 1300 is reflected, absorbed, and refracted by the finger or the fake fingerprint on the fingerprint contact surface 1210 of the prism 1200. The sensor unit 1500 acquires an image passing through the prism 1200, and provides a first digital image signal to the control unit 1600.

Subsequently, according to a control signal of the control unit 1600, the first light source unit 1300 stops the light radiation and the second light source unit 1400 starts light radiation. The second light source unit 1400 irradiates light in the internal space 1120 of the housing 1100 toward the insertion space 1110 of the housing 1100 without through the fingerprint contact surface 1210 of the prism.

The light irradiated from the second light source unit 1400 is reflected, absorbed, and refracted by the finger or the fake fingerprint in the insertion space 1110 of the housing 1100. The sensor unit 1500 acquires an image passing through the prism 1200, and provides a second digital image signal to the control unit 1600.

For example, in case that the second light source unit 1400 includes the first optical element 1410 and the second optical element 1420, the first optical element 1410 and the second optical element 1420 are separately controlled and are sequentially driven by the control unit 1600. The control unit 1600 sequentially receives a digital image signal corresponding to driving of the first optical element 1410 and a digital image signal corresponding to driving of the second optical element 1420.

Subsequently, the control unit 1600 analyzes a correlation by comparing the first digital image signal obtained as the first light source unit 1300 drives and the second digital image signal acquired as the second light source unit 1400 derives, and determines whether it is a fake fingerprint based on an analysis result.

Here, the control unit 1600 acquires a brightness value of the same location in each of the first digital image signal and the second digital image signal, calculates a function value indicating proximity information associated with a location of each coordinate when the location of each coordinate corresponds to an actual fingerprint on a plane including the obtained brightness values as coordinates, adds one or more calculated function values, and identifies an actual fingerprint or a fake fingerprint based on whether the added value is greater than or equal to a predetermined threshold value. The fake fingerprint identifying process performed by the control unit 1600 is disclosed in Korean patent No. 10-1436786 of the present applicant.

Also, based on a result acquired by comparing the first digital image signal acquired as the first light source unit 1300 drives and previously registered fingerprint information, the control unit 1600 may provide an authentication result for a fingerprint.

In the embodiments, the second light source unit 1400 includes a plurality of optical elements to cope with various types of fake fingerprints. For example, when a paper fake fingerprint is used, the second optical element 1420 may be a white LED to cope with the paper fake fingerprint. In the case of the paper fake fingerprint, transmittance of light irradiated by the white LED may be significantly higher than a finger. Accordingly, the control unit 1600 may compare the digital image signal acquired as the first light source unit 1300 drives and the digital image signal acquired as the second optical element 1420 drives, and may identify the paper fake fingerprint based on a comparison result.

As described above, since the second light source unit 1400 is fixedly supported to allow light, which is emitted from the second light source unit 1400 mounted in the internal space 1120 of the housing 1100, to be irradiated toward the insertion space 1110 of the housing 1100, the angle or quantity of light that reaches a finger or a fake fingerprint placed in the insertion space 1110 may be kept constant. Accordingly, the performance of identifying a fake fingerprint may be secured.

Also, in the case in which the second light source unit 1400 used for identifying a fake fingerprint includes a plurality of optical elements, a customized external light source corresponding to various types of fake fingerprint may be available by enabling the optical elements to irradiate light at different angles.

Furthermore, the touch area 100, which is defined in the insertion space 1110 of the housing 1100 to allow a fingerprint surface of a finger to be touched on the fingerprint contact surface 1210 of the prism 1200 includes the light transmission layer 111, and thus, light irradiated from the second light source unit 1400 to identify a fake fingerprint is irradiated along the light transmission layer 111. Therefore, a light transmission efficiency associated with a fingerprint surface of a finger or a fake fingerprint is increased and the performance of identifying a fake fingerprint is improved.

The above description just illustrates the technical idea of the present disclosure, and it will be understood by those skilled in the art to which this present disclosure belongs that various changes and modifications may be made without departing from the scope of the essential characteristics of the present disclosure. Therefore, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

The invention claimed is:

1. An apparatus for identifying a fake fingerprint, the apparatus comprising:
a prism having one side thereof a fingerprint contact surface for being contact with a finger of a user;
a first light source unit configured to irradiate light toward the finger contacted with the fingerprint contact surface through the prism;
a second light source unit configured to irradiate light toward the finger contacted with the fingerprint contact surface without passing through the prism, wherein the second light source unit comprises a first optical element and a second optical element, and the first optical element and the second optical element are arranged to respectively irradiate light at different angles with respect to the fingerprint contact surface;
a partition wall disposed on the one side of the prism to define an opening through which the fingerprint contact surface of the prism is exposed;
a transmission window through which the light irradiated by the second light source unit passes, wherein the transmission window comprises a first transmission window configured to allow a center of the light emitted by the first optical element to form a first angle with the fingerprint contact surface, and a second transmission window configured to allow a center of the light emitted by the second optical element to form a second angle with the fingerprint contact surface, the second angle being different from the first angle, wherein the light emitted by the first and second optical elements is from only one light source which is the second light source;
an image sensor configured to acquire a first image through the prism from the light irradiated by the first light source unit, and to acquire a second image through the prism from the light irradiated by the second light source unit; and
a processor configured to identify a fake fingerprint on the basis of a result acquired by comparing the first image and the second image,
wherein the transmission window is disposed at only one side of the partition wall.

2. The apparatus of claim 1, wherein the partition wall includes a light transmission layer that allows light emitted by the first optical element to pass through the light transmission layer and to be irradiated along the partition wall, and an object inserted into the opening is surrounded by the light transmission layer when the object is inserted into the opening to be irradiated by the light emitted from the light transmission layer.

3. The apparatus of claim 2, wherein the first transmission window is disposed at a location corresponding to the light transmission layer so that light emitted by the first optical element is irradiated around the opening through the light transmission layer.

4. The apparatus of claim 2, wherein the second transmission window is disposed outside the light transmission layer so that light emitted by the second optical element is irradiated to an outside of the light transmission layer.

5. The apparatus of claim 1, wherein the second transmission window is disposed at a higher position from the first transmission window.

6. The apparatus of claim 1, wherein an extension line of a center of the light emitted from the first optical element is not parallel with an extension line of a center of the light emitted from the second optical element.

7. The apparatus of claim 1, wherein the first angle is about 0 degree and the second angle ranges from about 25 degree to about 35 degree.

8. The apparatus of claim 1, wherein the first angle ranges from about 5 degree to about 10 degree and the second angle ranges from about 25 degree to about 35 degree.

9. The apparatus of claim 1, wherein first optical element and the second optical element emit light in different frequency bands, respectively.

10. The apparatus of claim 1, wherein the second optical element is a white light emitting diode.

* * * * *